B. A. SHAW.
ATTACHMENT FOR ANIMAL TRAPS.
APPLICATION FILED JUNE 28, 1910.

985,555.

Patented Feb. 28, 1911.

Witnesses
Frank B. Hoffman
John A. Donegly

Inventor
Bruce A. Shaw
By Victor J. Evans
Attorney

UNITED STATES PATENT OFFICE.

BRUCE A. SHAW, OF DAVENPORT, IOWA.

ATTACHMENT FOR ANIMAL-TRAPS.

985,555. Specification of Letters Patent. Patented Feb. 28, 1911.

Application filed June 28, 1910. Serial No. 569,349.

*To all whom it may concern:*

Be it known that I, BRUCE A. SHAW, a citizen of the United States, residing at Davenport, in the county of Scott and State of Iowa, have invented new and useful Improvements in Attachments for Animal-Traps, of which the following is a specification.

This invention relates to improvements in animal traps and has particular reference to an attachment for securing the trap to a suitable support.

The device is particularly intended for use with traps for catching animals which inhabit the banks of rivers and streams and is so constructed that the animal after being trapped, and plunging into the water as it invariably does will be prevented from again moving the trap to the bank to get its head above water and extricating itself by gnawing off its legs.

With the above and other objects in view, which will more fully hereinafter appear, the present invention consists in certain novel details of construction and arrangement of parts, hereinafter fully described, illustrated in the accompanying drawings, and more particularly pointed out in the appended claims; it being understood that various changes in the form, proportion, size, and minor details of the device may be made, within the scope of the appended claims, without departing from the spirit or sacrificing any of the advantages of the invention.

Figure 1:
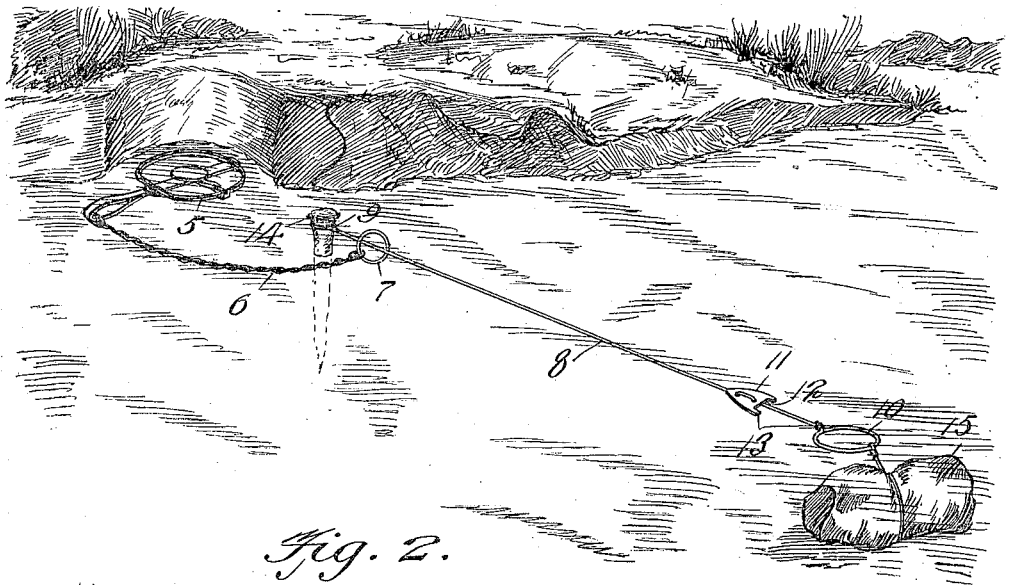
Figure 2:
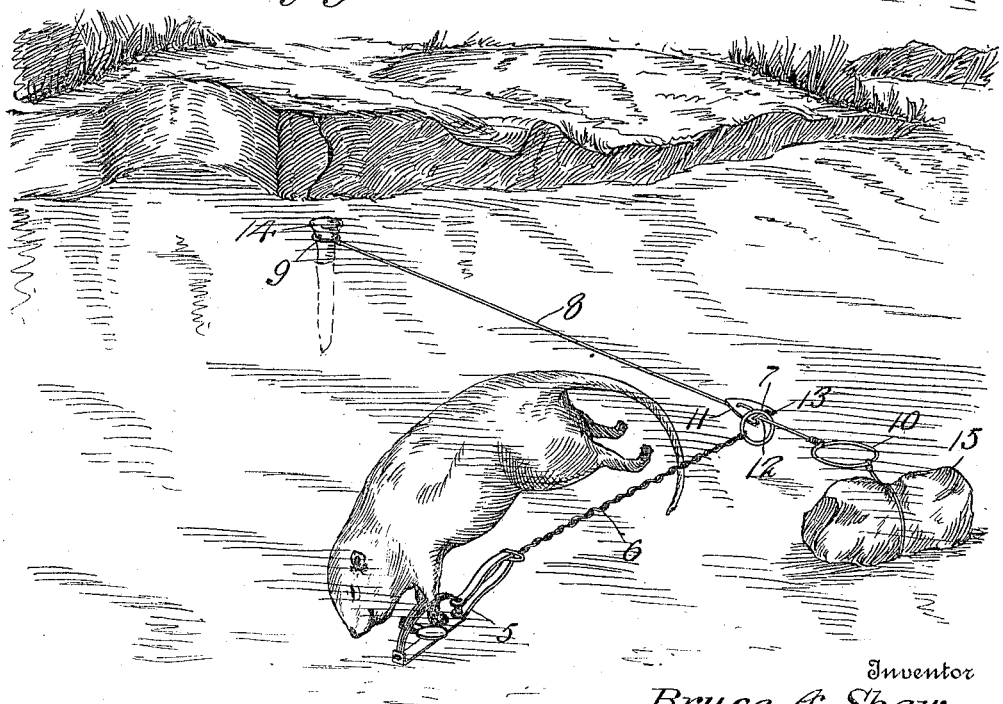

In the accompanying drawings, forming part of the specification:—Figure 1. is a perspective view of the device showing the same in operative position and also showing the trap in set position. Fig. 2 is a similar view showing the position of the trap after the same has engaged the animal and the latter plunged into the water.

Similar numerals of reference are employed to designate corresponding parts throughout.

The trap which is shown to be of the well-known jaw-type is designated by the numeral 5 and is provided with the usual chain 6 the latter having at its free end a ring 7.

The device forming part of the subject matter of the present invention is shown to comprise a length of wire or cable designated by the numeral 8. One end of the cable is provided with an eye or loop 9, while the opposite end is provided with an enlarged eye or loop 10 of greater diameter than the diameter of the ring 7 carried by the chain 6.

What will subsequently be termed a keeper is designated in general by the numeral 11. This member is preferably formed of a single piece of sheet metal triangular in contour and medially provided with a pair of spaced openings through which the cable 8 is inserted before the loops at the ends thereof are formed. The keeper is so positioned on the cable that its base end will be presented toward that end of the wire on which the enlarged loop 10 is formed. A recess 12 is formed in the base of the keeper, the sides of this recess lying beyond opposite sides of the wire and comprising jaws 13. The width of the base end of the keeper is a trifle less than the diameter of the ring 7, so that the ring may be passed over the keeper when moved toward that end of the wire provided with the enlarged loop 10.

In the use of the device the ring 7 is passed over the wire and a stake or other support 14 is passed through the smaller loop 9 at one end of the wire, and the stake driven in the bottom of the stream and at a point adjacent to the bank. A suitable weight or sinker 15 is secured to the enlarged eye or loop 10 and the sinker is thrown into the stream and outwardly from the stake 14. When the parts are so positioned the trap 5 is moved to the proper position on the bank, while the keeper 13 is adjusted so that it will occupy a position adjacent to the sinker 15. When an animal enters the trap and then plunges with the latter into the stream the ring 7 will move along the cable 8 and over the keeper 13. When the animal attempts to return, however, and moves the ring 7 toward the stake 14 one part of the said ring will enter the recess 12 and engage with one of the jaws, thus the animal will be prevented from moving the trap to the shore and will be eventually drowned.

It will be observed, in the event of the sinker 15 becoming disengaged from the eye 10 that by virtue of the size of the eye 10 the animal will be prevented from withdrawing the ring from the cable.

From the foregoing, it is evident that I have provided a device which is comparatively simple in structure and inexpensive in manufacture, embodying few parts and these so arranged that the danger of derangement will be reduced to a minimum.

I claim:—

1. A device for securing animal traps comprising a cable insertible through the ring of the trap chain, and having its opposite ends adapted to be secured to spaced supports, a keeper on the cable of a size permit the ring of the trap chain to pass thereover when the said ring is moved toward one end of the cable, the said keeper being provided at one end with means to positively engage the said ring when the latter is moved toward the opposite end of the cable.

2. A device for securing animal traps comprising a cable insertible through a ring of the trap chain and terminating at its opposite ends in eyes one of which is of greater diameter than the ring of the trap chain and both of said eyes being engageable by spaced supports, a keeper on the cable and located adjacent to one end thereof, the said keeper being of a size somewhat less than the ring of the trap chain to permit the said ring to pass thereover when moved toward one end of the cable, the said keeper being provided on one end with a recess to receive the ring of the trap chain when the latter is moved toward the opposite end of the cable.

In testimony whereof I affix my signature in presence of two witnesses.

BRUCE A. SHAW.

Witnesses:
DICK R. LANE,
AGNES PRESTON.

Copies of this patent may be obtained for five cents each, by addressing the "Commissioner of Patents, Washington, D. C."